May 12, 1964 C. F. BAMFORD 3,132,673
DOUBLE CHUCK FOR A VENEER LATHE
Filed June 22, 1959 3 Sheets-Sheet 1
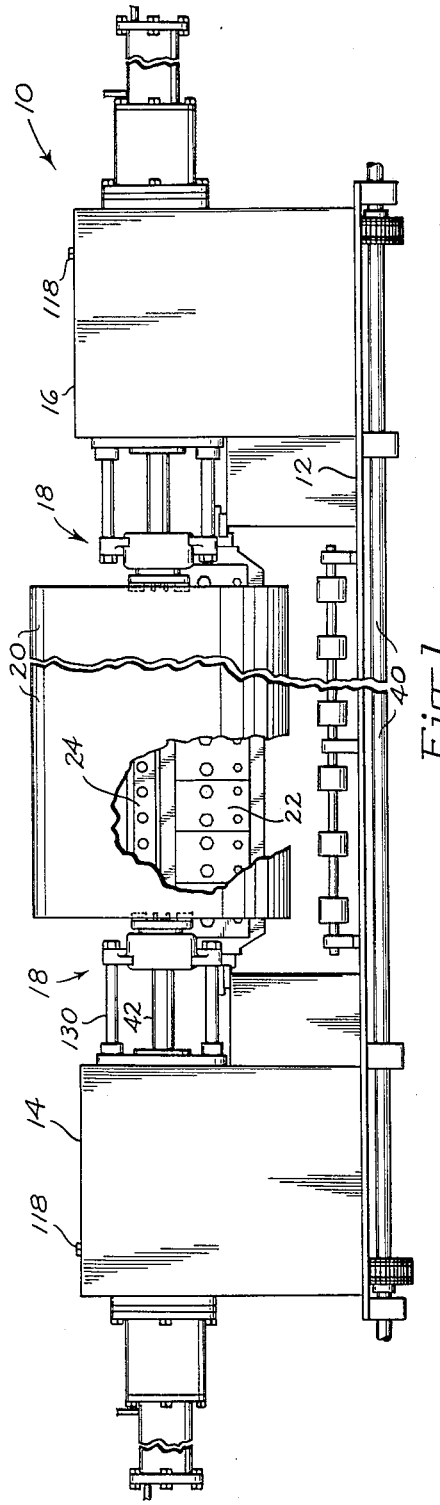
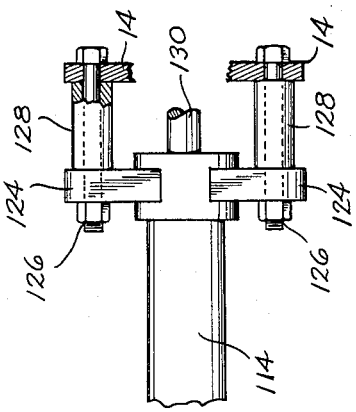
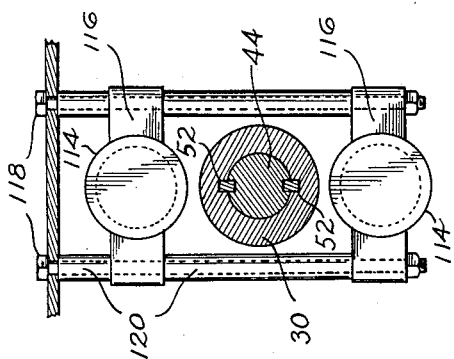
Charles F. Bamford
INVENTOR
BY Ramsey and Kolisch
Attys.

May 12, 1964

C. F. BAMFORD 3,132,673

DOUBLE CHUCK FOR A VENEER LATHE

Filed June 22, 1959

Charles F. Bamford
INVENTOR

BY Ramsey and Kolisch
Attys.

May 12, 1964 C. F. BAMFORD 3,132,673
DOUBLE CHUCK FOR A VENEER LATHE
Filed June 22, 1959 3 Sheets-Sheet 3
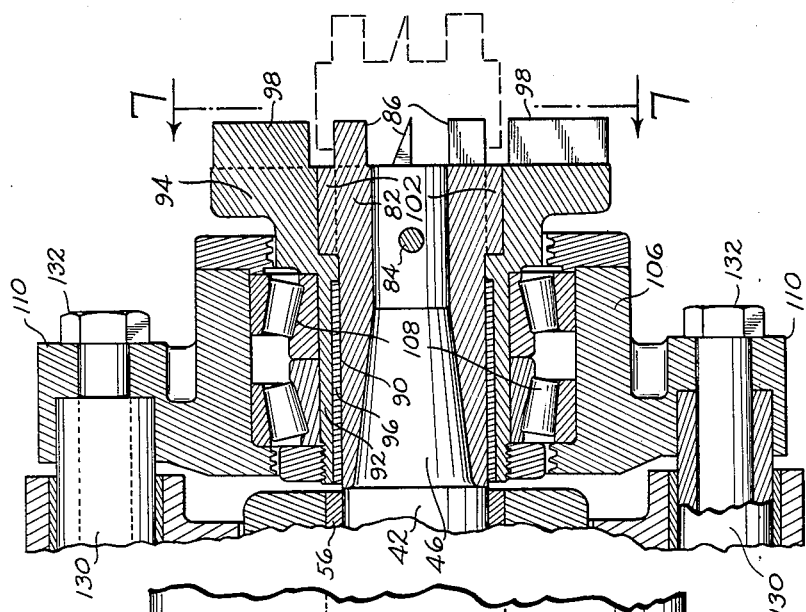
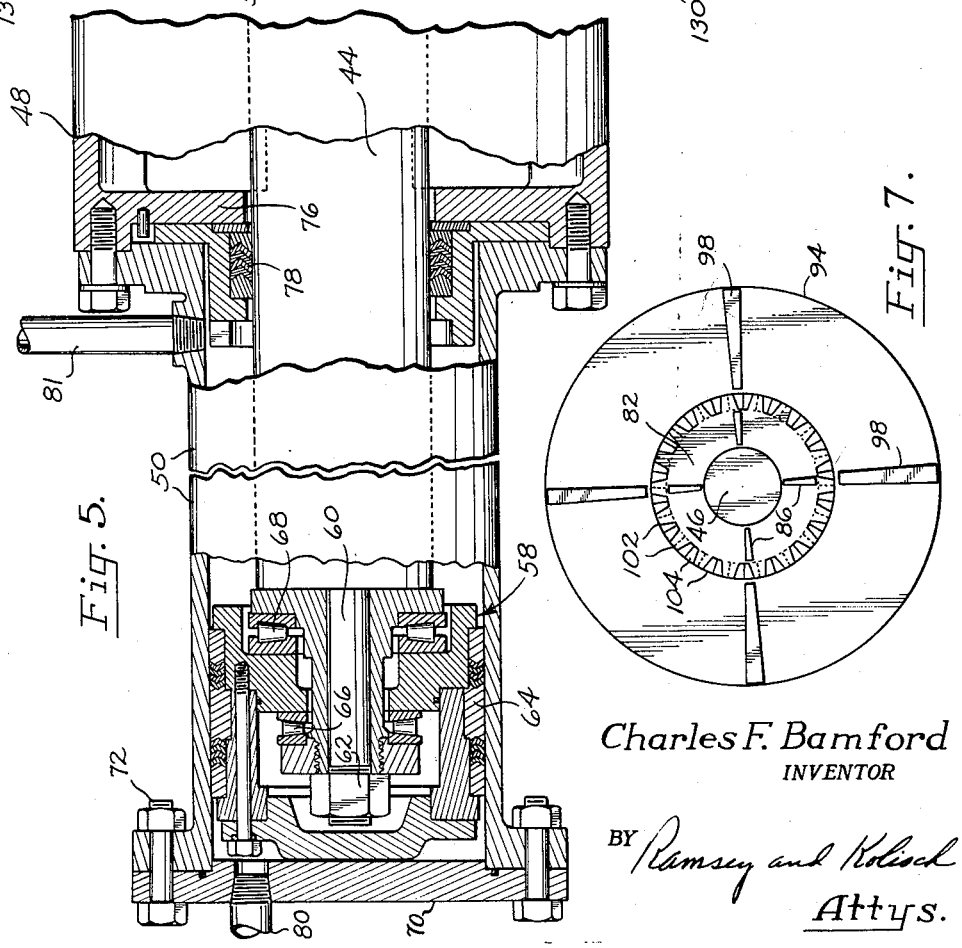
Charles F. Bamford
INVENTOR
BY *Ramsey and Kolisch*
Attys.

United States Patent Office 3,132,673
Patented May 12, 1964

---

3,132,673
DOUBLE CHUCK FOR A VENEER LATHE
Charles F. Bamford, Portland, Oreg., assignor to Premier Gear and Machine Works, Portland, Oreg., a corporation of Oregon
Filed June 22, 1959, Ser. No. 822,078
7 Claims. (Cl. 144—209)

This invention relates to veneer lathes, and more particularly to an improved construction for an extensible-retractable double chuck for such lathes.

Veneer lathes with extensible-retractable double chucks are valuable in the plywood industry, as they accommodate cutting of a log to a smaller diameter than possible if using only a single large chuck. Commonly such lathes comprise a relatively large chuck element concentric with a smaller chuck element, and means for shifting the two chuck elements in an axial direction. Initially the larger chuck is used, but when the diameter of the log becomes relatively small, the larger chuck is removed and the log is held solely by the smaller, inner chuck. By removing the larger chuck, the knife blade of the lathe is free to move radially into the log further to reduce the log diameter. In practice, it has been found advantageous to remove the larger chuck without stopping rotation of the lathe spindles, as this enables continuous production of veneer sheet.

The knife of a veneer lathe produces considerable resistance to turning movement in the lathe spindles. Thus, a veneer lathe must have a rugged construction, and the spindles must be of suitable proportion to withstand the high torque loads to which they are subjected. A factor limiting the size of the spindle for the smaller of the chucks is that this spindle moves through the center of the larger chuck when the latter is retracted from a log, and a large spindle for this smaller chuck makes necessary a reduction in the gripping surface of the larger chuck. In connection with the drive for the spindles, since the smaller of the chucks preferably grips a log and turns the same continuously while the larger chuck is backed off from the log, it is desirable that there be provided a direct drive to the spindle for the smaller chuck, and one which transmits torque to the chuck through parts that are fixed from axial movement relative to each other during withdrawal of the larger chuck.

Generally, it is an object of this invention to provide an improved construction for the double chuck of a lathe wherein there is provided mechanism for moving each chuck axially of the other, the mechanism being compact in construction without sacrifice of suitable length of stroke in the chucks or sacrifice of suitable strength in the spindles for rotating the chucks.

Another object of the invention is to provide such a veneer lathe having improved mechanism driving the spindle for the smaller of the chucks wherein the drive to the spindle is through parts that are axially in fixed relation to each other during retraction of the larger chuck.

More specifically, it is an object of the invention to provide, for a lathe, a pair of concentric chucks, one larger than the other, wherein the smaller of the chucks is driven by a spindle axially shiftable in a driving sleeve only during setting of the smaller chuck, and wherein the larger of the chuck elements receive its drive from the smaller chuck element by selectively engageable, positive-acting clutch means operatively interposed between the two chuck elements.

Another object of the invention is the provision of a novel construction for a motor means used to shift the larger of the chucks axially of the smaller one, and thus to effect engagement and disengagement of the clutch mechanism described.

A still further object is the provision of an improved motor means and associated mechanism for shifting the smaller of the chucks.

Other objects, features, and advantages are attained by the invention, which is described hereinbelow in conjunction with the accompanying drawings, wherein:

FIG. 1 is a front view of a veneer lathe, illustrating oppositely disposed chuck assemblies in the lathe mounted in upright pedestals at either end of the lathe and showing a log between the two chuck assemblies;

Figure 2:
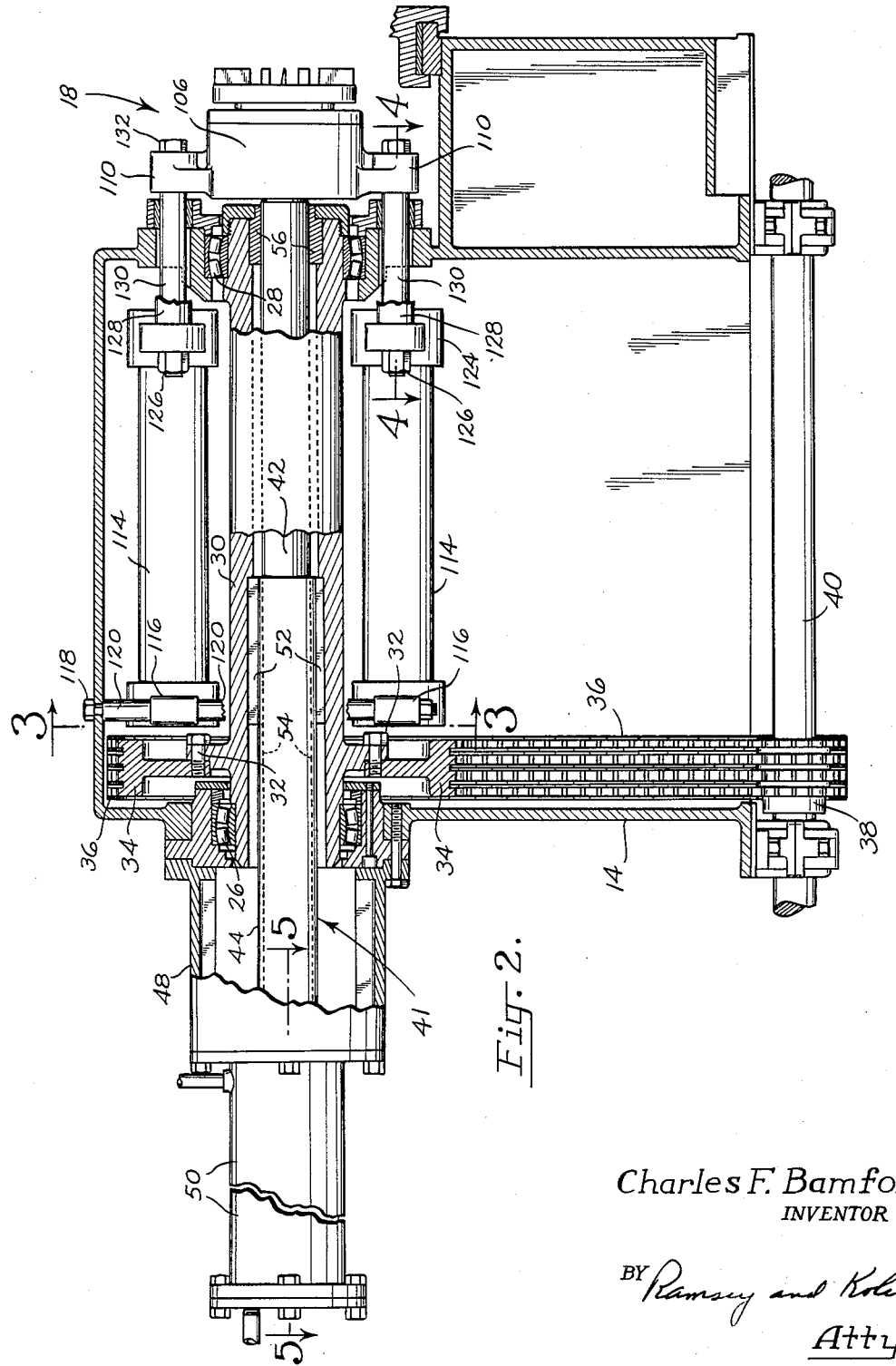
FIG. 2 is an enlarged view, with portions broken away, illustrating mechanism for adjusting the position and for driving the chucks of one of the chuck assemblies for the lathe.

FIGS. 3 and 4 are section views, taken along the lines 3—3 and 4—4, respectively, in FIG. 2, FIGS. 3 and 4 illustrating the mounting for the fluid motors used in axially shifting the larger of the chuck elements;

FIG. 5 is an enlarged view, taken along the line 5—5 in FIG. 2, illustrating the construction of the piston and cylinder used to extend the spindle for the smaller of the chuck elements;

FIG. 6 is an enlarged view of the double chucks of a chuck assembly; and

FIG. 7 is a view, taken along the line 7—7 in FIG. 6, showing the ends of the double chuck.

Referring now to the drawings, and more particularly to FIG. 1, 10 indicates a lathe generally, having a bed plate 12 supporting at either end of the lathe pedestals 14 and 16. A chuck assembly, indicated generally at 18, is extensible from each of the pedestals. The chuck assemblies, as will be described, are provided with suitable dogs that bite into opposite ends of a peeler log 20 during operation of the lathe. As is conventional with veneer lathes, the lathe shown also comprises a knife assembly 22 mounting a cutting knife, and a press bar assembly 24 which presses against the periphery of a log as veneer sheet is cut therefrom.

The chuck assemblies at either end of the lathe are similar and only one of them will be described below in detail. In general terms, each comprises a double chuck having a pair of chuck elements rotatable about a common axis. Provision is made for extending and retracting each of the chuck elements independently of the other, and for rotating the chuck elements under power whereby log 20 held thereby is turned in the lathe.

Specifically, and now referring more particularly to FIG. 2 wherein the chuck assembly for the left pedestal 14 is illustrated, rotatably mounted in bearing assemblies 26, 28 and extending between opposite side walls of the pedestal is a sleeve or quill 30. The sleeve during operation of the lathe is rotated under power. Thus, secured to the sleeve, as by screws 32, is a sprocket 34 concentric with the sleeve. Sprocket 34 constitutes a drive wheel means for rotating the sleeve. A drive chain 36 is trained at one end about sprocket 34. The other end of the drive chain 36 is trained over a sprocket 38 affixed to a drive shaft 40. As can be seen with particular reference to FIG. 1, shaft 40 extends beneath the bed plate of the lathe and also drives the chain corresponding to chain 36 for the chuck assembly of pedestal 16. Suitable motor means (not shown) is connected to shaft 40 to drive the shaft. The drive chain and sprockets constitute power-actuated means for rotating the sleeve 30.

Referring again to FIG. 2, extending through the interior of sleeve 30 is an elongated spindle unit 41 made up of a spindle 42 which has integral therewith and forming an extension thereof an aligned, shaft extension portion 44. An end 46 of the spindle projects outwardly from the right end of the sleeve, as shown in FIG. 6. Shaft extension 44 extends outwardly from the left end of the sleeve through a cylindrical housing section 48 fixed to the pedestal and a cylinder section 50 fixed to the end of section 48. Elongated keys 52 secure the sleeve and shaft extension for simultaneous rotation. The keys slide in keyways 54, and thus the spindle and shaft extension are free to move axially of sleeve 30. The spindle unit is centered within the sleeve by a sleeve bearing 56 at one end of the sleeve and spindle unit and a piston head assembly 58 connected to the other end of the unit and reciprocatable in cylinder 50 (see FIG. 5).

Considering now piston head assembly 58, and referring to FIG. 5, the assembly is secured to the end of shaft extension 44 by stud 60 and nut 62. The piston head assembly includes seals 64 that seal the periphery of the piston and the inner surface of cylinder 50. Thrust bearing assemblies 66, 68 accommodate rotation of the spindle unit relative to the piston assembly 58.

Cylinder 50 is closed off at its outer end by a cap 70 secured to the cylinder by nut and bolts 72. The cylinder is closed off at its other end by radial wall 76 of housing section 48. Seals 78 provide a fluid-tight seal with extension 44 at the location of radial wall 76. The piston and cylinder thus form an expansible-contractible fluid motor or power-actuated means for shifting the spindle unit along its axis. Conduits 80, 81 are for the supply and exhaust of pressure fluid on opposite sides of the piston head assembly. From the construction described, it should be obvious that when pressure fluid is admitted to the left side of the piston through conduit 80, the piston and spindle unit moves to the right from the position shown thereby to extend the right end of the spindle, and conversely, when pressure fluid is then admitted to the right side of the piston head assembly the spindle unit moves in the reverse direction to return to its original position.

With reference now to FIG. 6, secured to the protruding end 46 of the spindle is a chuck element indicated at 82. Chuck element 82 is the smaller of the chuck elements present in the double chuck assembly 18. The chuck is secured to the spindle to rotate therewith by a pin 84. The chuck includes dogs 86 which are sunk into the end of a log when mounting a log on the lathe.

Mounted about a stem portion 90 of chuck element 82 is the hub portion 92 of a second, larger chuck element 94. A sleeve bearing 96 is interposed between the two parts to reduce friction. Chuck element 94 is concentric with the inner chuck element 82, and has a hollow center which receives the smaller chuck when the latter is drawn within the larger chuck and in the position shown in FIG. 6. Chuck element 94 is also provided with dogs 98 for biting into the end of a log. Chuck element 94 is axially shiftable to the left of element 82 in FIG. 6 when the double chuck assembly is extended from the end of sleeve 30. Thus, with chuck element 82 moved to or beyond the position generally shown in dotted lines in FIG. 6, the larger chuck element 94 may be shifted axially away from the smaller chuck to the position shown in solid lines for the element in FIG. 6. With this relative positioning, the smaller chuck is free to rotate independently of the larger chuck. With the larger chuck surrounding the smaller chuck element so that both have the relative position shown in solid outline, a positive-acting clutch mechanism interposed between the two chucks is effective to connect the two for simultaneous rotation. Specifically, and now referring to FIGS. 6 and 7, the clutch or locking mechanism comprises external gear teeth 102 provided about the periphery of the smaller chuck element that mesh with internal gear teeth 104 of the larger chuck element when the two are shifted together. The two sets of gear teeth are beveled at those sets of ends that move over each other when the teeth are moved into meshing relation.

A power-actuated means is provided for shifting the larger chuck element axially of the smaller one. Thus, and referring to FIGS. 2 and 6, encircling sleeve portion 92 of the larger chuck is a collar 106. This is rotatably mounted about the sleeve portion on thrust bearing assembly 108. Protruding from top and bottom ends of the collar are a pair of lugs 110. Disposed along the sides of sleeve 30 and parallel to but offset laterally therefrom are the cylinder portions of a pair of piston-cylinder fluid motors 114. The left ends of the cylinder portions of these fluid motors are supported in place by means of yoke members 116 (see FIGS. 2 and 3) that have their opposite ends spaced apart and fixed relative to the top wall of the pedestal by elongated nut and bolt assemblies 118 and tubular spacers 120. The other ends of the cylinders are supported on the frame by yoke members 124 (FIGS. 2 and 4) secured on the inner side wall of the pedestal by nut and bolt assemblies 126 and spacers 128. The pistons for the fluid motors are connected to piston rods 130, and these project out from the cylinder portions of the motor and have their outer ends connected to collar 106 by screws 132. On expansion of the motors 114, the collar and the larger of the chuck elements are shifted axially to the right, whereas contraction of the fluid motors serves to shift the collar and larger chuck element in the reverse direction.

In operation of the veneer lathe, when a peeler log is to be mounted on the lathe the double chuck is shifted outwardly from the pedestal which mounts the same until the dogs of both of the chuck elements sink into the end of the log. This is done by expanding fluid motors 114 and by expanding the fluid motor comprising piston 58 and cylinder 50. When the log is firmly held, the log is cut by rotating sleeve 30, which rotates spindle unit 41, the smaller chuck secured thereto, and the larger chuck by reason of engagement of teeth 102, 104. As the diameter of the peeler log decreases with cutting of veneer therefrom, the knife advances toward the rotation axis of the spindles and comes increasingly closer to the periphery of the larger of the chuck elements. When a predetermined minimum clearance is reached, in order to avoid damage to the knife and to permit further cutting of the log, the bigger chuck is retracted by contraction of motors 114. This shifts the larger chuck element axially inwardly of the smaller one and disengages the clutch or locking mechanism comprising gear teeth 102, 104. For the rest of the cutting operation, the log is held entirely by the smaller of the chucks 82.

It should be obvious that the construction described has a number of advantages. For one thing, it is particularly important that drive to the chuck elements is transmitted from the sprocket 34 through sleeve 30 and thence directly by way of the spindle unit to the smaller of the chucks. Drive to the larger of the chuck elements is from the smaller chuck through internal-external gears 102, 104. When a log is positioned on the lathe and the larger chuck is moved off of the log while continuously rotating the smaller chuck and log (thus to impose a torque load on the spindle unit) the relative axial position of the spindle unit and sleeve 30 remains unchanged.

Thus, those parts that are subjected to a torque load are not at the same time subjected also to an axial shifting, such as would cause considerable wear in the parts transmitting rotation to the chuck (keys 52).

The construction is compact yet still permits an elongated stroke for the two chuck elements. By mounting the collar 106 for shifting the larger chuck directly around the exposed end of the spindle, and by mounting the fluid motors actuating this collar laterally about sleeve 30, the length of the extensible mechanism is maintained within reasonable limits. Compactness also results from mounting the piston for the motor that shifts the spindle unit directly on the end of the spindle unit.

As previously mentioned, considerable torques are developed in a veneer lathe. For this reason, it is a requirement that the spindles for the chucks be of large enough diameter to withstand the torque loads without straining the same. It will be noted that since the spindle 42 must extend through the larger of the chucks when only the small chuck is used to hold a log, the size of the spindle effects the size of the gripping surface for the larger chuck. To use a very large spindle diameter is to make necessary enlargement of the big chuck, if an effective grip in the big chuck is to be maintained, yet this is disadvantageous as it effects the minimum log diameter that can be handled by the big chuck. To take care of this problem, it is contemplated that a spindle shaft be used which has about the smallest diameter that may be used safely with the torque loads contemplated for the lathe. The drive for the spindle then is not made by keying sleeve 30 to the spindle, but instead by keying the sleeve to a shaft extension of the spindle. The key ways do not reduce the strength of the spindle unit as a shaft extension of large enough diameter is selected to enable cutting of key ways therein while leaving a core portion in the extension of a diameter at least equal to the diameter of the spindle.

It is claimed and desired to secure by Letters Patent:

1. In a veneer lathe, a frame, an axially shiftable spindle having a chuck at one end rotatably mounted in the frame, an enlarged shaft extension integral with the other end of the spindle and aligned with the spindle, drive wheel means for rotating the spindle encircling said shaft extension, means connecting for simultaneous rotation said shaft extension and drive wheel means and accommodating relative axial movement between the two, a cylinder fixed to the frame surrounding said shaft extension, an enlarged piston connected to the end of the shaft extension away from the spindle, said piston being rotatable relative to said shaft extension and reciprocatable together with said shaft extension to and fro within said cylinder, means for admitting fluid under pressure to opposite sides of said piston thereby to induce movement of the piston in said cylinder, an axially shiftable second chuck larger than the first chuck mounted adjacent said one end of the spindle and in concentric relation with said first chuck, positive-acting, toothed clutch means at said one end of the spindle operatively interposed between the first and second chucks and positively engaged to connect the two for simultaneous rotation on movement of said second chuck axially in an outward direction from said one end of the spindle, and power-actuated means comprising at least one piston-cylinder parallel to the spindle and offset laterally to one side thereof for shifting in an axial direction said second chuck.

2. In a veneer lathe, a frame, a sleeve rotatably mounted in the frame, a spindle mounted within the sleeve having one end projecting from one end of the sleeve, said spindle being extensible from said one end of the sleeve, a chuck connected to said one end of the spindle, means connecting for rotation the spindle and sleeve but accommodating axial shifting between the two, power-actuated means for rotating the sleeve, a second chuck having a hub portion rotatably mounted about said one end of the spindle and axially shiftable relative thereto, selectively engaged locking means for connecting the hub portion and spindle for simultaneous rotation, the latter being engaged upon movement of the hub portion relative to the spindle in an outward direction from said one end of the spindle, plural piston-cylinders placed about the sleeve parallel to the sleeve, means connecting one end of the piston-cylinders to the frame and the other end to said hub portion whereby actuation of the piston-cylinders produces movement of the hub portion and power-actuated means for shifting said one end of the spindle in a direction outwardly of said sleeve.

3. In a veneer lathe, a frame, a sleeve rotatably mounted in the frame, an elongated spindle unit mounted within the sleeve having one end projecting from one end of the sleeve, said spindle unit being extensible from the sleeve, said one end of the spindle unit having a chuck integral therewith, means connecting for simultaneous rotation the spindle unit and the sleeve but accommodating axial shifting between the two, power-actuated means for rotating the sleeve, a cylinder fixed to the frame surrounding the other end of the spindle unit, a piston rotatably secured to said other end of the spindle unit reciprocatable in said cylinder, means for admitting fluid under pressure to opposite sides of the piston thus to induce axial shifting of the piston and spindle unit, a second chuck having a hub portion rotatably mounted about said one end of the spindle unit and axially shiftable relative thereto, selectively engaged locking means for connecting the hub portion and spindle unit for simultaneous rotation, the latter locking means becoming engaged upon movement of the hub portion relative to the spindle unit, and power-actuated means for shifting the hub portion in said outward direction, said power-actuated means comprising at least one piston-cylinder disposed parallel to the sleeve and offset laterally to one side thereof.

4. In a veneer lathe, a frame, a spindle rotatably mounted on said frame and shiftable axially thereon, a chuck secured to said spindle adjacent one end, drive wheel means for rotating said spindle and means connecting said drive wheel means and spindle for simultaneous rotation and accommodating axial shifting of the spindle relative to the drive wheel means, a second chuck larger than the first adjacent said one end of the spindle, means rotatably mounting said second chuck in concentric relation relative to said first chuck and accommodating axial shifting of said second chuck, positive-acting toothed clutch means at said one end of the spindle operatively interposed between said first and second chucks, and positively engaged to connect the two for simultaneous rotation on shifting of said second chuck axially in an outward direction on said one end of the spindle, power-actuated means for shifting axially said spindle, and power-actuated means for shifting axially said second chuck.

5. The lathe of claim 4 wherein said last mentioned power-actuated means comprises at least one elongated piston-cylinder mechanism parallel to and offset laterally to one side of the spindle and mounted in fixed position on the frame.

6. In a veneer lathe, a frame, a power-driven sleeve journaled in the frame, a spindle mounted within the sleeve connected to the sleeve for rotation therewith and with one end of the spindle extensible from one end of the sleeve, a first chuck secured to said one end of the spindle, a second chuck mounted adjacent said first chuck in concentric relation with respect to said first chuck and means mounting said second chuck accommodating rotation and axial shifting relative to said first chuck, disengageable means for operatively connecting said second chuck and said spindle for rotation with said spindle, means for axially shifting said spindle, and means for axially shifting said second chuck.

7. In a veneer lathe, a frame, a power-driven sleeve journaled in the frame, a spindle mounted within the sleeve connected to the sleeve for rotation therewith and with one end of the spindle extensible from one end of the sleeve, a first chuck secured to said one end of the spindle, a second chuck journaled on said one end of said spindle and shiftable axially relative to said spindle, disengageable means for operatively connecting said second chuck and said spindle for rotation with said spindle, a collar mounted in a position encircling said one end of the spindle and means rotatably mounting said second chuck in said collar, piston-cylinder means mounted on said frame and connected to said collar for axially shifting said collar, and piston-cylinder means connected to said spindle for axially shifting said spindle.

References Cited in the file of this patent

UNITED STATES PATENTS

| | | |
|---|---|---|
| Re. 24,713 | Latimer | Oct. 6, 1959 |
| 163,640 | Davis | May 25, 1875 |
| 2,338,125 | May | Jan. 4, 1944 |
| 2,501,387 | Haumann | Mar. 21, 1950 |
| 2,959,202 | Springate | Nov. 8, 1960 |